US008120857B2

United States Patent
Hedges et al.

(10) Patent No.: US 8,120,857 B2
(45) Date of Patent: Feb. 21, 2012

(54) APPARATUS AND METHOD FOR MOUNTING AND CALIBRATING A HELMET-MOUNTED DISPLAY

(75) Inventors: George Darrell Hedges, Greenfield, PA (US); Anthony William Bugno, Clarks Summit, PA (US); Mark William Edel, Downers Grove, IL (US); Michael Koichi Uchima, Naperville, IL (US); Robert B. Atac, Batavia, IL (US)

(73) Assignee: Gentex Corporation, Carbondale, PA (US)

( * ) Notice: Subject to any disclaimer, the term of this patent is extended or adjusted under 35 U.S.C. 154(b) by 164 days.

(21) Appl. No.: 12/252,078

(22) Filed: Oct. 15, 2008

(65) Prior Publication Data

US 2010/0091377 A1 Apr. 15, 2010

(51) Int. Cl.
*G02B 27/14* (2006.01)
*G09G 5/00* (2006.01)

(52) U.S. Cl. ............ 359/630; 359/634; 359/636; 345/7; 345/8

(58) Field of Classification Search .................. 359/630, 359/129, 496, 618, 631, 629, 634, 636, 638–640, 359/831, 833–834; 353/31, 34, 81; 451/28, 451/41
See application file for complete search history.

(56) References Cited

U.S. PATENT DOCUMENTS

| 4,361,384 A | 11/1982 | Bosserman |
| 4,449,787 A * | 5/1984 | Burbo et al. ............... 313/524 |
| 4,961,626 A | 10/1990 | Fournier, Jr. et al. |
| 4,987,608 A | 1/1991 | Cobb |
| 5,226,181 A | 7/1993 | Polednak et al. |
| 5,331,684 A | 7/1994 | Baril et al. |
| 5,412,545 A | 5/1995 | Rising |
| 5,471,678 A | 12/1995 | Dor |
| 5,506,730 A | 4/1996 | Morley et al. |
| 5,542,627 A | 8/1996 | Crenshaw et al. |
| 5,581,806 A | 12/1996 | Capdepuy et al. |
| 5,623,730 A | 4/1997 | Baudou et al. |
| 5,649,061 A * | 7/1997 | Smyth ............................ 706/16 |
| 5,713,548 A | 2/1998 | Boyer et al. |
| 5,734,359 A | 3/1998 | van Hooreweder |
| 5,914,816 A | 6/1999 | Soto et al. |
| 5,940,891 A | 8/1999 | Lane |

(Continued)

FOREIGN PATENT DOCUMENTS

EP 0395570 10/1990

(Continued)

OTHER PUBLICATIONS

Brochure: "The Q-Sight™ family of helmet display products," BAE Systems, Oct. 2007.

(Continued)

*Primary Examiner* — Dawayne Pinkney
(74) *Attorney, Agent, or Firm* — Design IP

(57) ABSTRACT

A helmet mounted display (HMD) system comprising a display pod having a light wave optical element. The display pod is designed to be attached to a base plate located above the brow of a helmet using opposing hook and loop-style fastener pads or alternatively, a pair of locking disks. The mounting position of the display pod is adjustable within three degrees of freedom, including lateral positioning along a plane that is co-planar to a mounting surface for the display pod, as well as rotation about an axis that is perpendicular to the mounting surface. The HMD system is adapted to compensate for variations in mounting position using a bore sighting adjustment.

33 Claims, 8 Drawing Sheets

U.S. PATENT DOCUMENTS

| | | | |
|---|---|---|---|
| 6,061,182 A | 5/2000 | Carmeli et al. | |
| 6,141,160 A | 10/2000 | Pniel | |
| 6,249,386 B1 | 6/2001 | Yona et al. | |
| 6,445,506 B1 | 9/2002 | Eccles | |
| 6,457,179 B1 | 10/2002 | Prendergast | |
| 6,472,776 B1 | 10/2002 | Soto et al. | |
| 6,606,114 B1 * | 8/2003 | Gordon et al. | 348/64 |
| 6,687,053 B1 | 2/2004 | Holmes et al. | |
| 6,782,654 B1 | 8/2004 | Borchardt | |
| 6,811,348 B1 | 11/2004 | Meyer et al. | |
| 6,862,748 B2 | 3/2005 | Prendergast | |
| 6,879,443 B2 | 4/2005 | Spitzer et al. | |
| 6,957,449 B2 | 10/2005 | Prendergast | |
| 6,992,275 B1 * | 1/2006 | Knapp | 250/214 VT |
| 7,004,439 B1 | 2/2006 | Taylor et al. | |
| 7,219,370 B1 | 5/2007 | Teetzel et al. | |
| 7,234,173 B2 | 6/2007 | McCalla et al. | |
| 2004/0245383 A1 * | 12/2004 | Udall | 244/54 |
| 2005/0167590 A1 | 8/2005 | Miyano et al. | |
| 2006/0069380 A1 | 3/2006 | Chen et al. | |
| 2006/0143764 A1 | 7/2006 | Reed et al. | |
| 2006/0290451 A1 | 12/2006 | Prendergast et al. | |
| 2007/0226865 A1 | 10/2007 | Lindgren | |
| 2008/0002262 A1 | 1/2008 | Chirieleison | |

FOREIGN PATENT DOCUMENTS

| | | |
|---|---|---|
| EP | 1619535 | 1/2006 |

OTHER PUBLICATIONS

Brochure: "Day Hud, Compatible with all helmets plus clear and tinted visors," EFW, Inc., publication date unknown.

Brochure: "Integrated NVG-HUD for IHADSS," EFW, Inc., publication date unknown.

"Photographs of Commanche Compatibility HMD System—developed by Honeywell," Honeywell International Inc., publication date unknown.

Brochure: "Lite Eye® Helmet Mounted Display System—Low Cost Day / Night Helmet Mounted Display System," Kaiser Electronics, published as late as Dec. 31, 2001.

International Search Report, mailed Mar. 10, 2010, completed by US ISA.

* cited by examiner

APPARATUS AND METHOD FOR MOUNTING AND CALIBRATING A HELMET-MOUNTED DISPLAY

BACKGROUND AND FIELD OF INVENTION

The present invention relates to a helmet mounted display (HMD) system.

The benefits of HMD systems in military and recreational applications are well-known. HMD allows the user to view vehicle, target cueing and other relevant information without having to refocus or look away from the user's surroundings. Many existing military helmet systems, such as aircrew helmets, were designed and manufactured prior to widespread implementation of HMD. Due to the high cost and long period of time required to develop an entirely new helmet system, there is a need for an HMD system that can be easily incorporated into existing military helmet systems, without requiring the redesign of other helmet systems and without interfering with the use of other existing helmet systems, such as visors and night vision goggles (NVG).

SUMMARY OF THE INVENTION

In one respect, the invention comprises, an apparatus comprising: a first mounting bracket affixed to a first portion of a helmet, the first mounting bracket having a first mounting surface; and a display pod having a second mounting surface, the display pod having a display device that is adapted to display images, the display pod having a disengaged state, in which the second mounting surface is positioned opposite the first mounting surface, the second mounting surface can be moved and rotated relative to the first surface, and an engaged state in which the second mounting surface is positioned against the first mounting surface and the position of the second mounting surface is fixed relative to the first mounting surface.

In another respect, the invention comprises an apparatus comprising: a mounting bracket attached to a helmet and located above a brow edge of the helmet; and a display pod having a light wave-guide optical element display, the display pod being part of a helmet-mounted display (HMD) system; wherein the display pod and the mounting bracket are adapted to enable the display pod to be removably affixed to the mounting bracket.

In yet another respect, the invention comprises a method of mounting a display pod to a helmet, the display pod including a transparent display device and being part of a helmet-mounted display system, the method comprising: (a) positioning the display pod so that the display device is located in a line of sight of an eye of a person wearing the helmet by moving a second surface located on the display pod relative to the first mounting surface located on the helmet; and (b) retaining the location of the display device in the line of sight by positioning the second mounting surface against the first mounting surface and affixing the position of the second mounting surface relative to the first mounting surface.

BRIEF DESCRIPTION OF THE DRAWINGS

The present invention will hereinafter be described in conjunction with the appended drawing figures, wherein like numerals denote like elements. It should be understood that the drawings are for purposes of illustrating the concepts of the present invention and are not necessarily the only possible configuration for illustrating the present invention.

DETAILED DESCRIPTION OF THE PREFERRED EMBODIMENT(S)

Figure 1:
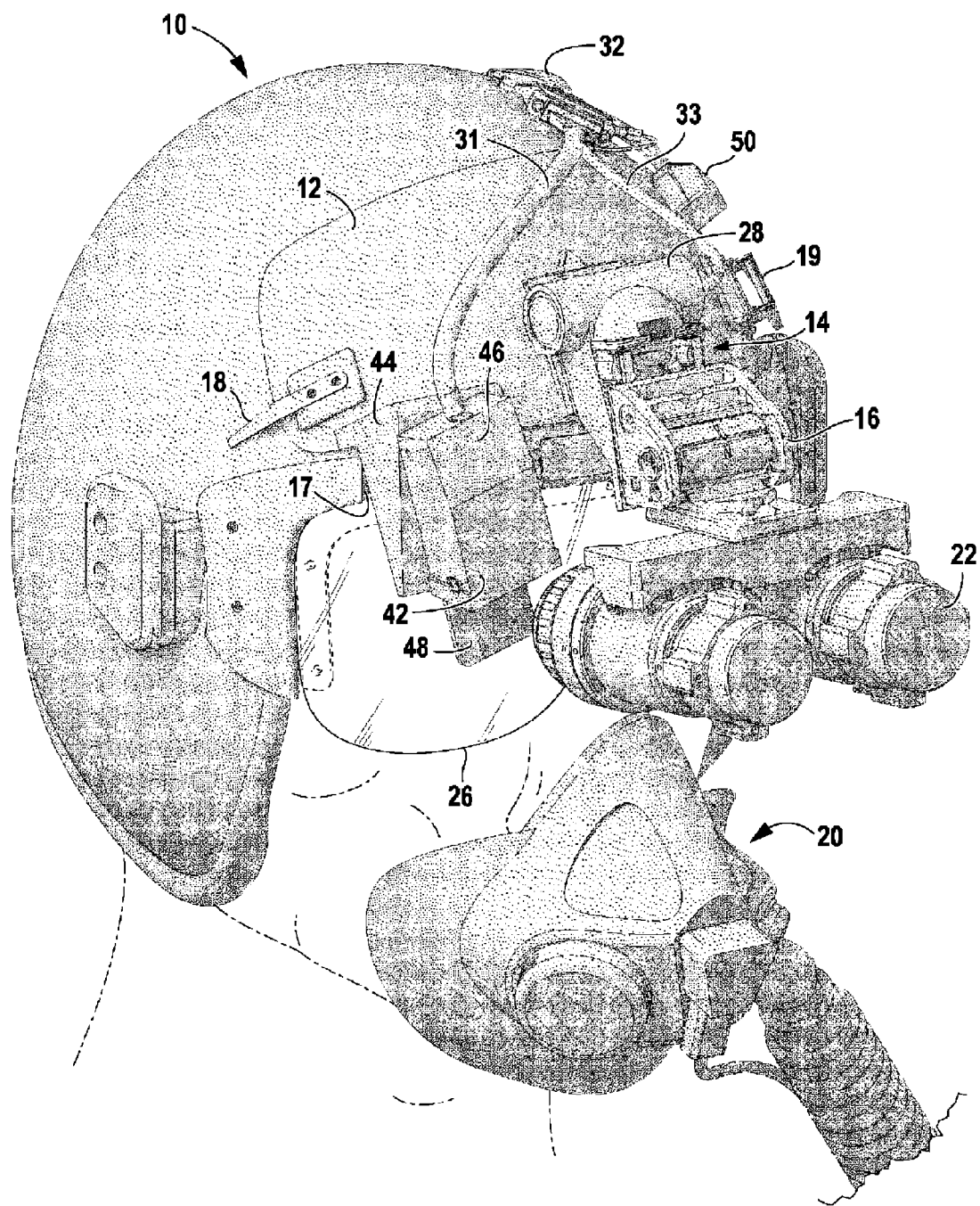
FIG. 1 is a perspective view of a helmet system, shown with NVG installed.

The ensuing detailed description provides preferred exemplary embodiments only and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions match those of the helmet wearer and are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

All examples and conditional language recited herein are intended to aid the reader in understanding the present principles and the concepts contributed by the inventor to furthering the art, and are to be construed as being without limitation to such specifically recited examples and conditions. Moreover, all statements herein reciting principles, aspects, and embodiments of the present principles, as well as specific examples thereof, are intended to encompass both structural and functional equivalents thereof. Additionally, such equivalents may include both currently known equivalents as well as equivalents as yet undeveloped, including any elements developed in the future that perform the same function, regardless of structure.

In the specification, elements which are common to more than one disclosed embodiment of the invention are identified in the drawings using reference numerals that differ by factors of 100. For example, a first embodiment of a display pod is identified in the specification and in FIG. 1 by reference numeral 42 and a second embodiment of the display pod is identified in the specification and in FIG. 5 by reference numeral 142. Elements which are discussed in the specification with respect to one embodiment may be identified by reference numeral in other embodiments in which that element appears, but may not be independently referred to in the specification.

Figure 2:
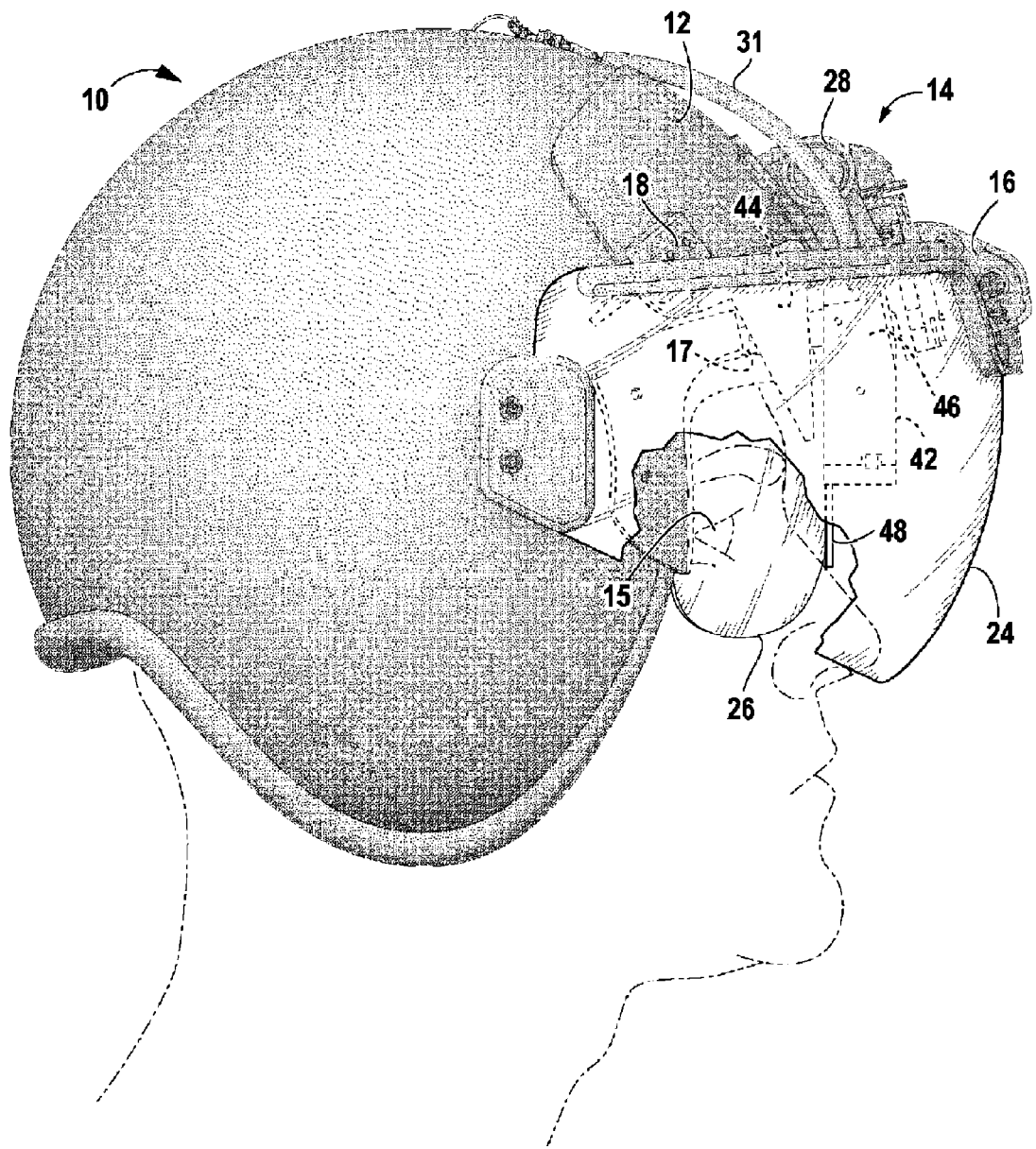
FIG. 2 is a right side view of the helmet system of FIG. 1, shown with a visor installed.

Referring to FIGS. 1 and 2, a preferred embodiment of the present invention is shown, in which reference numeral 10 refers generally to a helmet which incorporates the features of the present invention. The helmet 10 includes a base plate 12 (also referred to in the art as a "banana bar") which is used as a mounting platform for certain helmet-related accessories. The base plate 12 is preferably positioned above a brow edge 17 and is removable from the helmet 10 and, in this embodiment, is affixed to the helmet 10 by latches 18, 19. The base plate 12 includes an accessory bracket 14 (also referred to in the art as a "jet mount") having an accessory joint 16, to which accessories such as night vision goggles 22 (FIG. 1) or a visor 24 (FIG. 2) can be removably attached. Batteries 28, which are used a power source for the night vision goggles 22, are located above the accessory joint 16. A power cable 33 is connected to a helmet-vehicle interface cable 32 and provides an alternative power source for the night vision goggles 22. The night vision goggles 22 and visor 24 are shown in a deployed position (i.e., in front of the eyes of the user) in FIGS. 1 and 2. The accessory joint 16 is also preferably configured to enable accessories to be pivoted up and away from the front of the helmet 10, and therefore, out of the user's field of view. A step-in visor 26 (also referred to as a step-in lens) may also be provided and may be used in addition to or instead of the visor 24.

The helmet 10 also includes a helmet-mounted display system, comprising a display pod 42, a helmet tracker sensor 50 (FIG. 1). A display cable 31 connects the display pod 42 to the helmet-vehicle interface cable 32. The sensor 50 is also connected to the helmet-vehicle interface cable 32. The helmet-vehicle interface cable 32 connects the display pod 42 and the helmet tracker sensor 50 to an interface control unit (ICU) 34 (see FIG. 8). Other parts of the helmet-mounted display system and their relationship to other vehicle-related systems will be described herein.

The display pod 42 comprises a display driver 46 that displays HMD information on a light wave optical element (LOE) 48. An LOE 48 is a preferred display device for this application because it is small, thin, lightweight and transparent. These characteristics are of particular importance in applications in which the display pod 42 is retrofitted to an existing helmet system. One suitable type of display pod 42 is the model PD-18 LOE display system manufactured by Lumus Ltd. of Rehovot, Israel.

The primary purpose of the LOE 48 is to display useful information to the user, such as targeting information and vehicle information, without interfering with use of any of the accessories mounted on the accessory joint 16. In order to enable the LOE 48 to be used in combination with the NVG 22 and to avoid interfering with the operation of the NVG 22 or the visor 24, the display pod 42 is adapted such that the LOE 48 is positioned in front of one of the eyes 15 of the user and between the user's eye 15 and the location of the innermost surfaces of the NVG 22 or visor 24 when each is in a deployed position. Mounting of the display pod 42 above the brow edge 17 also reduces interference with other helmet-related devices, such as a respirator 20.

It should be noted that, when used in combination with the NVG 22, the display pod 42 is preferably positioned so that the NVG 22 can be viewed through the LOE 48 and positioned close to the eye 15 (i.e., without interference from the display driver 46). The thinness of the LOE 48 allows the NVG 22 to be positioned closer to the eye 15 than many other types of display devices.

In this embodiment, the helmet tracker sensor 50 is attached to the base plate 12 of the helmet 10. Its function is to provide the helmet-mounted display system with information concerning the orientation and movement of the helmet 10. In alternate embodiments, the helmet tracker sensor 50 could be attached directly to the display pod 42.

Figure 3:
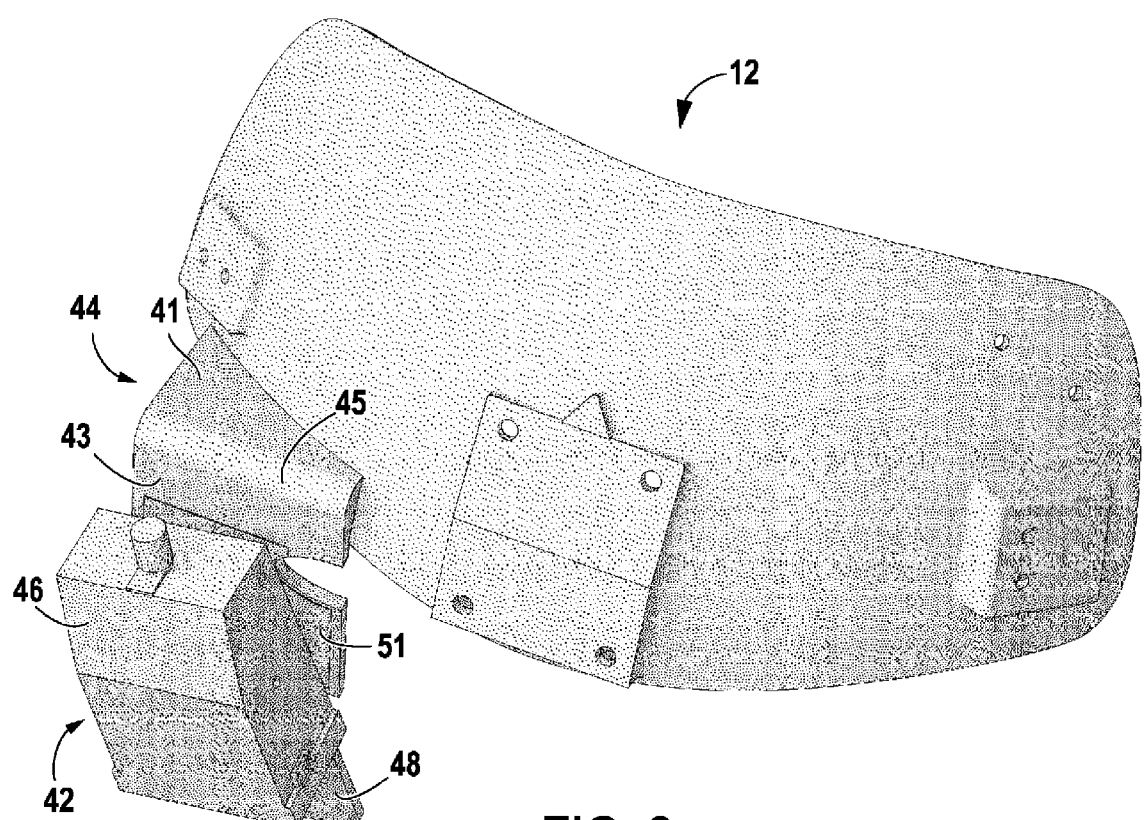
FIG. 3 is a front, top perspective view of a mounting bracket and a display pod.
Figure 4:
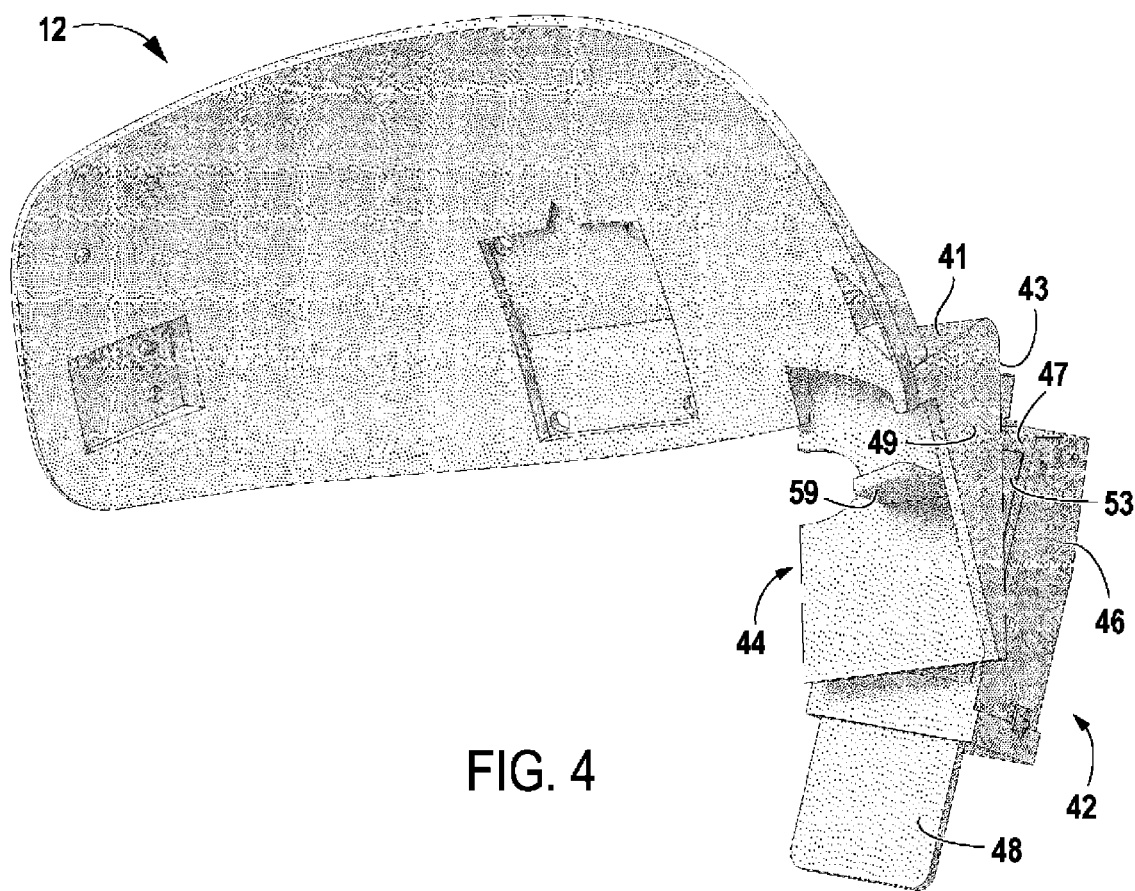
FIG. 4 is a bottom, rear perspective view of the mounting bracket and the display pod.

Referring now to FIGS. 3 and 4, the mounting structure for the display pod 42 will be described in greater detail. The base plate 12 includes a mounting bracket 44 which extends outwardly from the lower right end of the front of the base plate 12. This configuration is designed to enable the display pod 42 to be used with the user's right eye 15. In alternate embodiments, the mounting bracket 44 could be located on the lower left end of the base plate 12, which would enable the display pod 42 to be used with the user's left eye.

The mounting bracket 44 includes a mounting surface 43, which is rectangular in shape and substantially planar in this embodiment. The mounting surface 43 is connected to the base plate 12 by members 41, 49. Similarly, the display pod 42 includes a substantially planar mounting surface 47 on the rear side of the display pod 42. Preferably, the mounting surface 47 is complimentary in size and shape to the mounting surface 43. The mounting bracket 44 may also include a tab 59 located on the rear side of the mounting surface 43. The tab 59 is positioned to fit just under the brow edge 17 and prevent the mounting bracket 44 from rising up when external forces (such as wind, sudden acceleration/deceleration, etc.) act on the display pod 42.

In order to allow the display pod 42 to be easily positioned by a user, then locked into place, it is preferable that a fastener be provided as part of each of the mounting surfaces 43, 47. Preferably, the fastener will allow the mounting surface 47 to be positioned (i.e., moved in any direction along a plane that is co-planar to the mounting surface 43) and rotated with respect to mounting surface 43. In this embodiment, a reclosable, adhesive-backed fastener 51, 53 is affixed to each of the mounting surfaces 43, 47.

The required specifications for the reclosable fastener 51, 53 will depend upon the intended use of the helmet 10. One preferred type of reclosable fastener is a Dual Lock™ brand reclosable fastener, manufactured by 3M Company. The Dual Lock™ brand reclosable fastener is a preferred fastener because it allows the mounting surface 47 to be positioned and rotated relative to mounting surface 43 so that the LOE is centered (i.e., in the line of sight) of the user's left eye, then locked into position by pressing the display pod 42 against the mounting surface 43. Alternatively, other types of hook and loop-style fasteners could be used. For the purposes of the specification and claims, the term "hook and loop-style fastener" should be understood to include traditional hook and loop fasteners, as well as other types of adhesive-backed reclosable fasteners, such as Dual Lock™ brand reclosable fasteners.

If a traditional hook and loop fastener is used, a thin divider (such as a piece of paper) is preferably placed between the hook portion and the loop portion while the display pod 42 is being positioned in order to prevent the hook portion from prematurely engaging the loop portion. When the display pod 42 has been positioned and rotated to the desired position, the divider can be slid out and the hook and loop portions pressed together.

Accordingly, the mounting structure for the display pod 42 provides a simple and inexpensive means for enabling the user to position the display pod 42 in the line of sight of one of the user's eyes, then retain that position by pressing the mounting surfaces 43, 47 together—thereby affixing the mounting surfaces 43, 47 to each other.

The display pod 42 mounting system of the present invention also enables the display pod 42 to adapt to users of the helmet 10 having many different head and eye geometries, as well as to accommodate user preferences. Accordingly, the mounting surfaces 43, 47 and the fastener 51, 53 are preferably sized to enable the center of the LOE 48 to be located at any position within an "eye box." An eye box is a rectangular area that is intended to reflect expected differences in pupil distance (the horizontal dimension of the eye box) and differences in the distance from the eye of a user to the top of his/her head (the vertical dimension of the eye box) for users of the display pod 42. In this embodiment, the eye box would be an area that is co-planar with the mounting surface 47. It is, of course, acceptable if the center of the LOE 48 has a positioning range that extends beyond the eye box.

Figure 5:
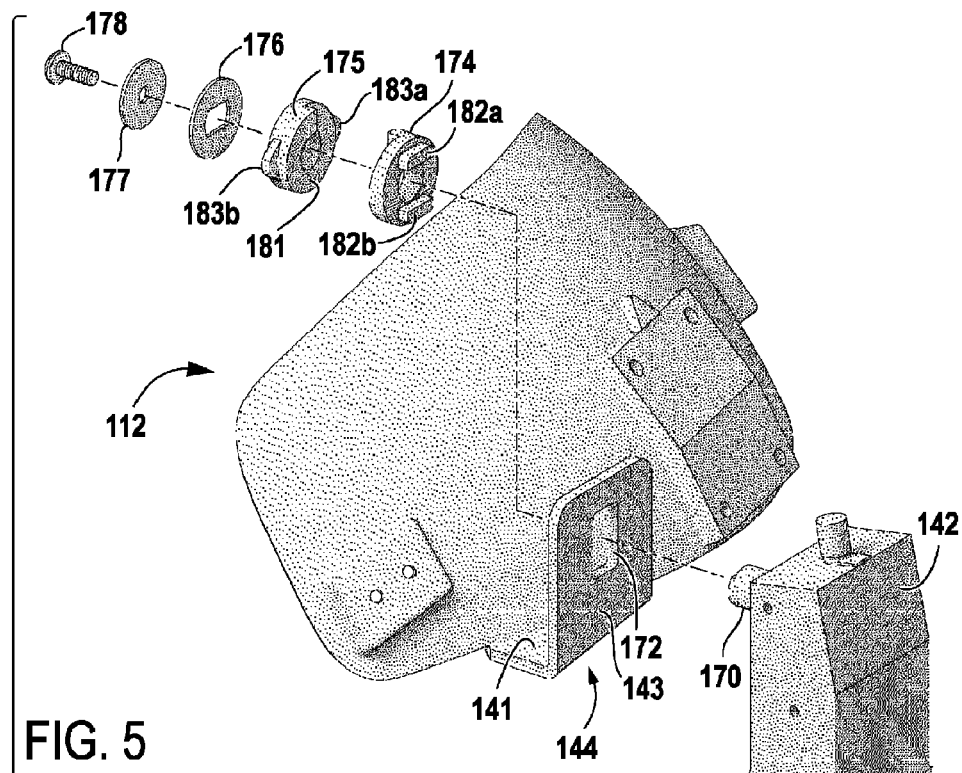
FIG. 5 is a front exploded view of a second embodiment of the mounting bracket and display pod.
Figure 6:
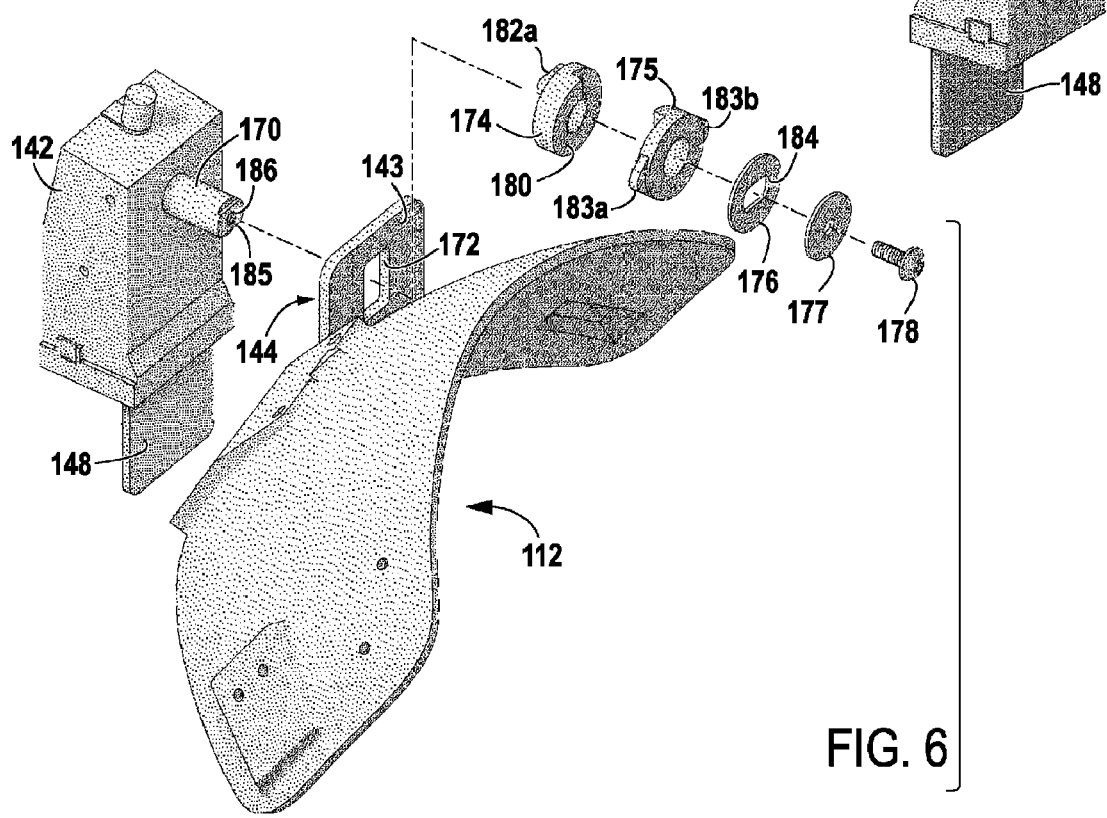
FIG. 6 is a rear exploded view of the embodiment shown in FIG. 5.

An alternative display pod mounting structure is shown in FIGS. 5 through 7B. Referring to FIGS. 5 and 6, the display pod 142 includes rod 170, which is designed to be inserted through an elongated vertical slot 172 located on the vertical member 143 of the mounting bracket 144. In this embodiment, the vertical member 143 extends upwardly from the horizontal member 141 of the mounting bracket 144.

The rod 170 preferably has a round cross-sectional shape, so that it can be freely rotated in the slot 172 (which allows for adjustment of the rotational position of the display pod 142). The width of the slot 172 is preferably slightly larger than the diameter of the rod 170. In order to allow for adjustment of the vertical position of the display pod 142, the height (the vertical dimension in FIG. 6) of the slot 172 is significantly larger (preferably at least twice) the diameter of the rod 170.

To secure the display pod 142, the rod 170 is inserted through the slot 172, then an inner disk 174, an outer disk 175, an inner washer 176 and an outer washer 177 are slid onto the rod 170 and secured in place by a screw 178 that is screwed into a threaded hole 186 in the rod 170. The inner and outer disks 174, 175 have mating surfaces 180, 181 which are helical and are complimentary in shape. The inner disk 174 has two vertically-aligned members 182a, 182b, each having a width that is slightly smaller than the width of the slot 172. When inserted into the slot 172, the members 182a, 182b insure proper orientation of the inner disk 174 and prevent rotation of the inner disk 174 when the display pod 142 is in a locked position. The outer disk 175 has two tabs 183a, 183b, which provide a means for a person to rotate the outer disk 175.

The inner washer 176 has a truncated circular opening 184 (i.e., having linear top and bottom sides), which engages a tip 185 of the rod 170 having the same shape as the opening 184. The opening 184 and tip 185 cooperate to prevent the inner washer 176 from rotating when the outer disk 175 is rotated, and therefore, preventing rotation of the outer disk 175 from moving the display pod 142 from its set position.

Figure 7:
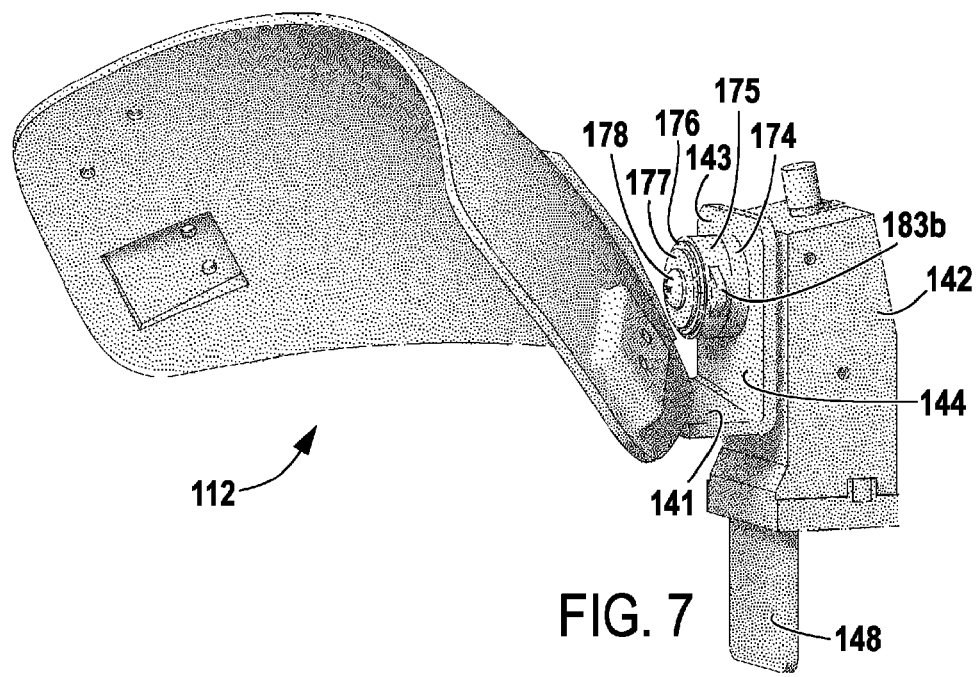
FIG. 7 is a right, rear perspective view of the embodiment shown in FIG. 5, showing the display pod in an assembled position.
Figure 7A:
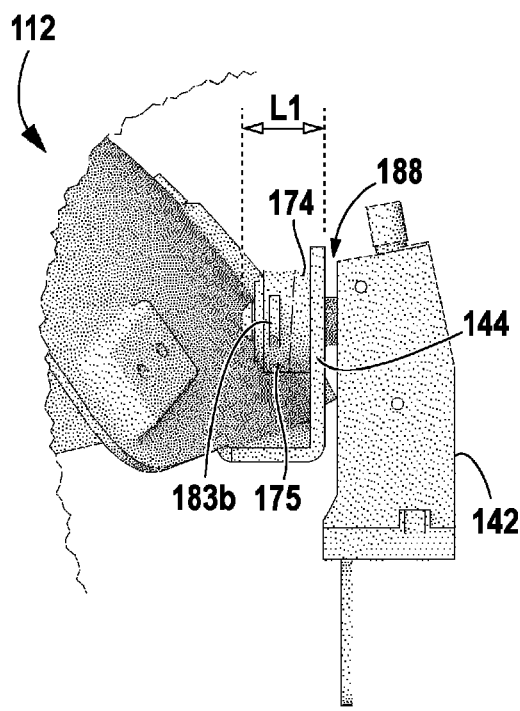
FIG. 7A is a partial right side view of the mounting bracket and display pod shown in FIG. 5, showing the display pod in a locked position.

Referring now to FIGS. 7 and 7A, once the display pod 142 is attached to the bracket 144 by the screw 178, the outer disk 175 is positioned so that the overall length L1 of the inner and outer disks 174, 175 is at a minimum (hereinafter "adjustment position"). In the adjustment position, the user can position the display pod 142 in the line of sight of one of the user's eyes by rotating the display pod 142 about the rod 170 and moving the display pod 142 up and down in the slot 172.

Figure 7B:
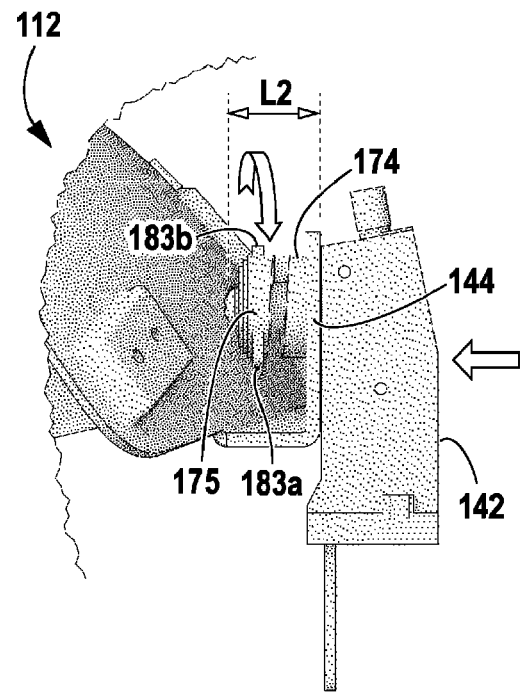
FIG. 7B is partial right side view of the mounting bracket and display pod shown in FIG. 5, showing the display pod in an unlocked position.

Referring to FIG. 7B, once the display pod 142 is in the desired position, the user then rotates the outer disk 175 clockwise using the tabs 183a, 183b, which increases the overall length L2 (also referred to as "axial dimension") of the inner and outer disks 174, 175. Rotation is continued until the display pod 142 is tightly drawn against the vertical member 143, which locks the display pod 142 into position.

Figure 8:
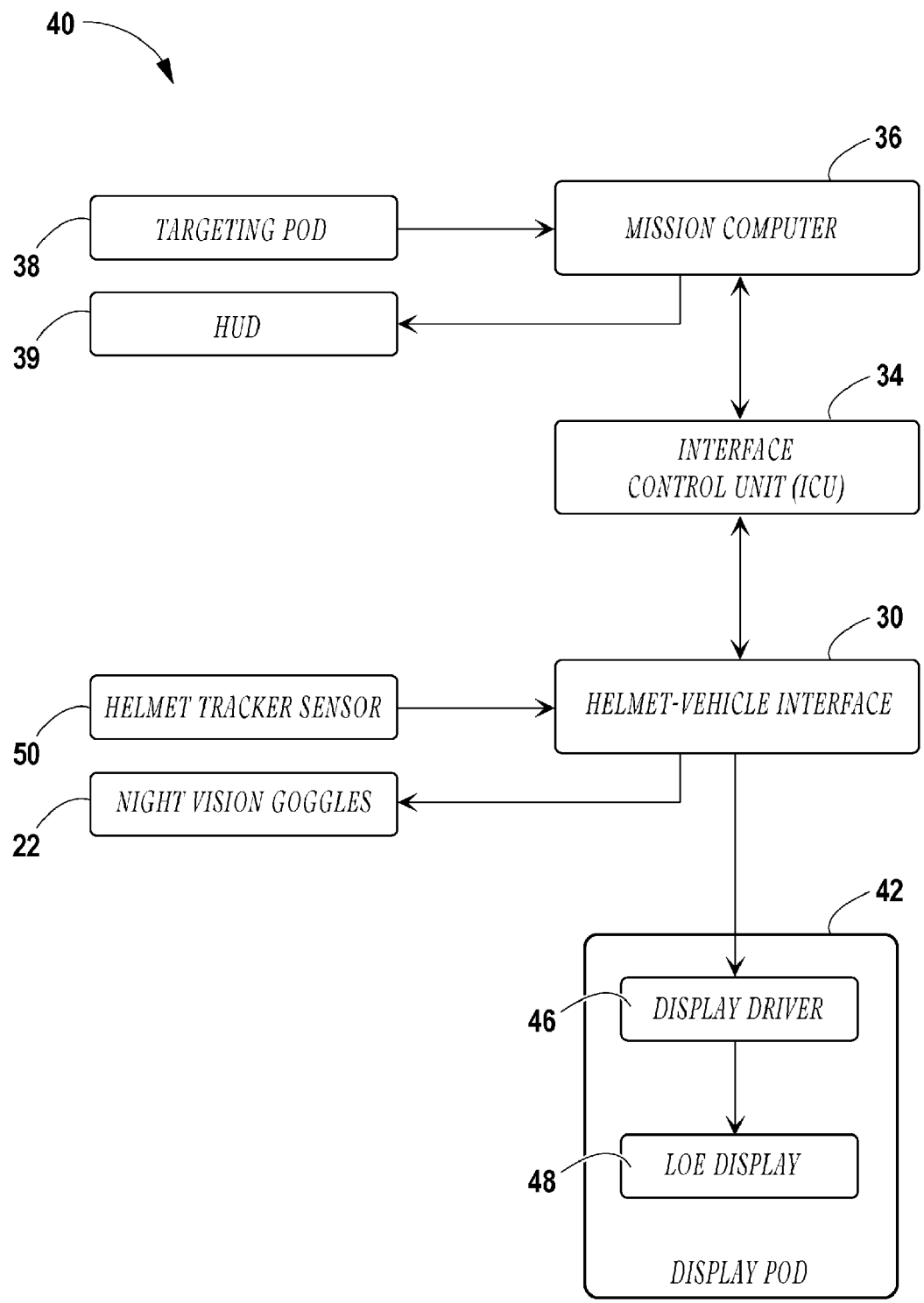
FIG. 8 is a block diagram showing the functional relationship between the display pod and other selected helmet and vehicle systems.

FIG. 8 provides a schematic representation of major components of an exemplary helmet-vehicle system 40 with which the display pod 42 (or display pod 142) could be used. Targeting information is fed to a mission computer 36 by a targeting pod 38, which typically includes an infrared camera (not shown). The mission computer 36 sends target-related and aircraft-related data to a heads-up display (HUD) system 39. Target-related and aircraft-related data is also sent by the mission computer 36 to an interface control unit 34, which processes and forwards the data to the display pod 42 via the helmet-vehicle interface 30. Data from the helmet tracker sensor 50 is collected by the helmet-vehicle control unit via the helmet-vehicle interface 30. As noted above, the night vision goggles 22 can use the helmet-vehicle interface 30 as a power source by replacing one of the two batteries with a power adapter. The remaining battery acts as a backup.

The display pod 42 is intended to display various combinations of targeting-related and/or vehicle-related information to the user (referred to herein as "symbology"). In many applications, the displayed symbology is determined by the mission computer 36. Examples of target-related information include friendly and hostile target tracking and a crosshair or reticle (e.g., indicating aiming direction for a vehicle-mounted weapon). Examples of vehicle-related information include airspeed (or ground speed for a ground-based vehicle), altitude, horizon, and heading. In some applications it will be desirable to divide the display of targeting-related and vehicle-related information between the display pod 42 and the HUD system 39. For example, target tracking information could be displayed on the HUD system 39, and a crosshair and vehicle-related information could be displayed by the display pod 42.

Due to variability in the position and orientation of the LOE 48 and variability of the position and orientation of the helmet 10, a calibration procedure is required to insure accurate alignment of symbology displayed by the display pod 42. One method of calibrating the symbology displayed on the display pod 42 in an aircraft environment will now be described. In general, the calibration procedure is designed to compensate for variations in position and orientation of the display pod 42 relative to the helmet 10, as well as the more common need to calibrate (boresight) the helmet 10 itself relative to the vehicle.

Figure 9:
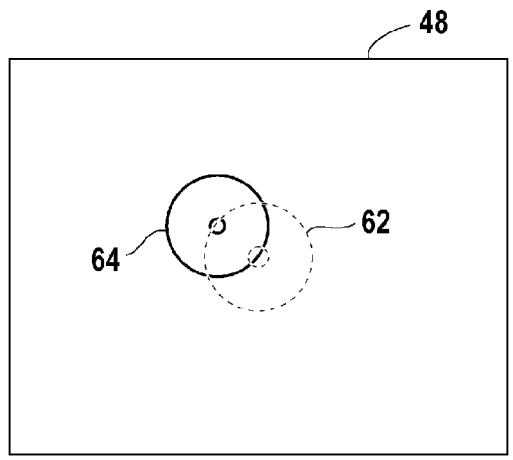
FIG. 9 is a representation of HMD helmet-referenced and HUD reticles, shown prior to coarse bore sighting.
Figure 10:
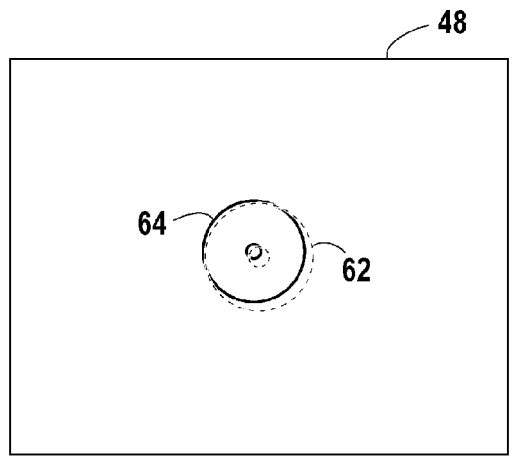
FIG. 10 is a representation of HMD helmet-referenced and HUD reticles, shown after coarse bore sighting.

A "coarse boresight" step, shown in FIGS. 9 and 10, is performed first. A helmet-referenced reticle 64 is displayed by the LOE 48. In many aircraft, the helmet-referenced reticle 64 is displayed by selecting a "coarse boresight" mode on a multi-function control display (MFCD). A similarly-shaped gun boresight reticle 62 is displayed on the HUD and is visible through the LOE 48. The user orients the helmet 10 vertically, centers the helmet 10 on the HUD, and aligns the reticle 64 with reticle 62 by yaw (rotating the helmet about a vertical axis) and tilt. The user then presses a calibration button, e.g., on a hands-on throttle and stick (HOTAS) to indicate proper alignment. Precision alignment of the reticles 62, 64 is not necessary in the coarse boresight step.

Figure 11:
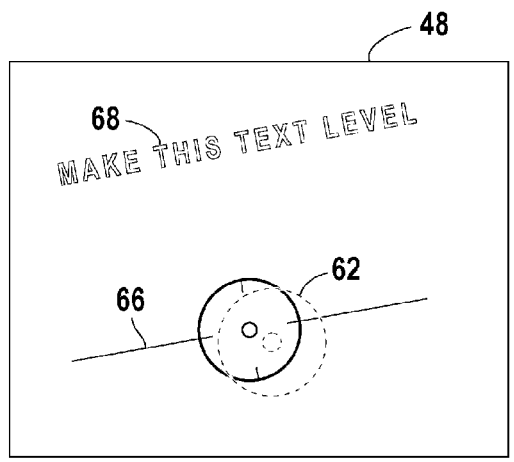
FIG. 11 is a representation of HMD aircraft-referenced and HUD reticles, shown prior to fine bore sighting.
Figure 12:
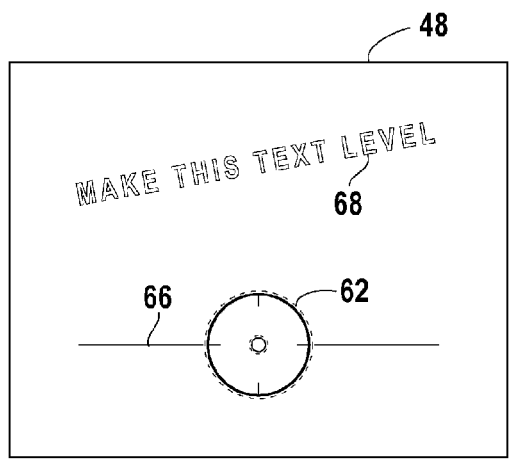
FIG. 12 is a representation of HMD aircraft-referenced and HUD reticles, shown after fine bore sighting.

The second step in the calibration process, shown in FIGS. 11 and 12, is a "fine boresight." As in the coarse boresighting step, the gun boresight reticle 62 is displayed on the HUD and is visible through the LOE 48. In this step, the helmet-referenced reticle 64 displayed by the LOE 48 is replaced with an aircraft-referenced reticle 66, which preferably includes lines representing the wings of the aircraft. In addition, helmet-referenced text 68 is also preferably provided. The user then performs a precise alignment of the aircraft-referenced reticle 66 to the gun boresight reticle 62, preferably using cursor controls for tilt, yaw and roll located on the HOTAS.

Figure 13:
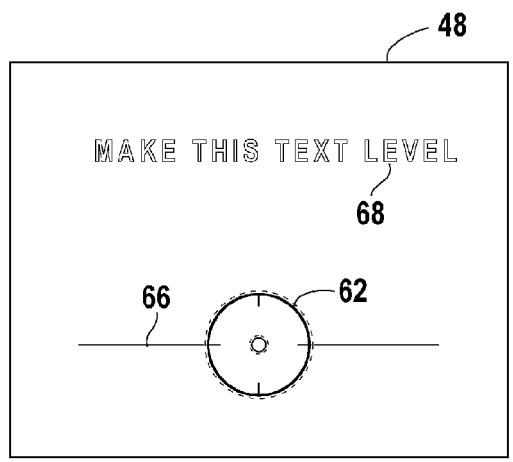
FIG. 13 is a representation of HMD aircraft-referenced and HUD reticles, shown after helmet symbol adjustment.

If, following the completion of the fine boresighting step, the helmet-referenced text 68 is not level when the vehicle-referenced reticle 66 and gun boresight reticle 62 are aligned, an optional third calibration step (shown in FIGS. 12 and 13) can be performed using a different roll control on the HOTAS. This step will be necessary if the helmet 10 was not vertical during the coarse boresighting step.

Calibration data is preferably collected by the interface control unit 34 and/or the mission computer 36 during each of the above-described boresighting steps. The interface control unit 34 is preferably programmed to use the calibration data to adjust how HMD image data received from the mission computer 36 (including target-related and aircraft-related data) is displayed on the display pod 42. In most cases, such adjustments will consist of rotational and/or translational shifting of the images forwarded to the display driver 46 so that the images displayed on the LOE 48 are in the correct rotational and translational position, based on the calibration data. Any suitable software-based algorithm could be used to perform the desired shifting.

While there have been shown, described and pointed out fundamental novel features of the invention as applied to preferred embodiments thereof, it will be understood that various omissions, substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

The invention claimed is:

1. An apparatus comprising:
   a first mounting bracket affixed to a first portion of a helmet, the first mounting bracket having a first mounting surface; and
   a display pod having a second mounting surface, the display pod having a display device that is adapted to display images, the display pod having a disengaged state, in which the second mounting surface is positioned opposite the first mounting surface, the second mounting surface can be moved along at least one and no more than two degrees of translational freedom relative to the first mounting surface and rotated along only a single degree of rotational freedom relative to the first mounting surface, and an engaged state in which the second mounting surface is positioned against the first mounting surface and the position of the second mounting surface is fixed relative to the first mounting surface.

2. The apparatus of claim 1, wherein the helmet further comprises a brow edge and the first mounting bracket is located above the brow edge.

3. The apparatus of claim 1, wherein the first portion is a base plate that is removably attached to the helmet.

4. The apparatus of claim 3, wherein the helmet includes a brow edge and the base plate is positioned above the brow edge when the base plate is attached to the helmet.

5. The apparatus of claim 4, wherein the base plate includes a second mounting bracket adapted to engage at least one vision-related device.

6. The apparatus of claim 5, wherein the at least one vision-related device comprises at least one selected from the group of night vision goggles and a visor.

7. The apparatus of claim 5, wherein the first and second mounting brackets are separately attached in a non-interfering relationship to the base plate.

8. The apparatus of claim 5, wherein the display device is adapted to be positioned between an eye of a person wearing the helmet and the at least one vision-related device that is engaged with the second mounting bracket.

9. The apparatus of claim 8, further comprising a step-in visor which is positioned between the eye and both the display device and the at least one vision-related device.

10. The apparatus of claim 1, wherein the second mounting surface is complimentary in shape to the first mounting surface.

11. The apparatus of claim 10, wherein the first and second mounting surfaces are substantially planar.

12. The apparatus of claim 1, wherein the display device is transparent.

13. The apparatus of claim 1, wherein the display device comprises a light wave-guide optical element.

14. The apparatus of claim 1, further comprising a hook and loop-style reclosable fastener having a first portion located on the first mounting surface and a second portion located on the second mounting surface.

15. The apparatus of claim 1, further comprising:
   a rod extending from the second mounting surface through an opening located in the first mounting bracket, the opening having a length that is substantially larger than the largest cross-sectional dimension of the rod; and
   first and second disks positioned on the rod and having complimentary-shaped mating surfaces, the first mounting bracket being positioned between the first and second disks and the display pod;
   wherein the display pod is transitioned between the disengaged state and the engaged state by rotating one of the first and second disks relative to the other of the first and second disks.

16. The apparatus of claim 1, further comprising a head tracking sensor affixed to the helmet that is adapted to track the orientation of the helmet.

17. The apparatus of claim 1, wherein the display pod is part of a helmet-mounted display (HMD) system.

18. The apparatus of claim 17, wherein the HMD system further comprises a helmet-vehicle interface that connects the display pod to an interface control unit.

19. The apparatus of claim 17, wherein the HMD system is adapted to display targeting pod cuing symbology on the display device.

20. The apparatus of claim 1, wherein the HMD system includes a calibration function that allows the position and orientation of images displayed on the display device to be adjusted to compensate for the position and orientation of the display device relative to the helmet.

21. An apparatus comprising:
  a mounting bracket attached to a helmet and located above a brow edge of the helmet; and
  a display pod having a light wave-guide optical element display, the display pod being part of a helmet-mounted display (HMD) system;
  wherein the display pod and the mounting bracket are adapted to enable the display pod to be removably affixed to the mounting bracket.

22. The apparatus of claim 21, wherein the light wave-guide optical element display has a center, and the display pod and the mounting bracket are adapted to enable the center of the light wave-guide optical element display to be positioned at any location within a predetermined eye box when the display pod is affixed to the mounting bracket.

23. The apparatus of claim 21, wherein the display pod and the mounting bracket are adapted to position the light wave-guide optical element display between a user's eye and a vision-related device without inhibiting the function of the vision-related device.

24. A method of mounting a display pod to a helmet, the display pod including a transparent display device and being part of a helmet-mounted display system, the method comprising:
  (a) positioning the display pod so that the display device is located in a line of sight of an eye of a person wearing the helmet by moving a second surface located on the display pod relative to the first mounting surface located on the helmet; and
  (b) retaining the location of the display device in the line of sight by positioning the second mounting surface against the first mounting surface and affixing the position of the second mounting surface relative to the first mounting surface such that the second mounting surface is translatable relative to the first mounting surface along at least one and no more than two translational degrees of freedom and rotatable relative to the first mounting surface along only a single rotational degree of freedom.

25. The method of claim 24, wherein positioning the display pod comprises placing a second mounting surface located on the display pod against a first mounting surface located on the helmet and moving the second mounting surface relative to the first mounting surface.

26. The method of claim 24, wherein positioning the display pod comprises placing a second mounting surface located on the display pod against a first mounting surface and moving the second mounting surface relative to the first mounting surface, the first mounting surface being part of a base plate that is removably attached to the helmet and is located above a brow edge of the helmet.

27. The method of claim 24, wherein positioning the display pod further comprises positioning the display pod so that the display device is located between the eye of the person wearing the helmet and a vision-related device when the vision-related device is attached to the helmet and in a deployed position.

28. The method of claim 24, wherein the retaining step comprises engaging a first portion of a hook and loop-style fastener located on the first mounting surface with a second portion of a hook and loop-style fastener located on the second mounting surface.

29. The method of claim 24, wherein the retaining step further comprises rotating a first disk relative to a second disk, the first and second disks being located on a rod that extends from the second mounting surface through an opening through the first mounting surface, the rotation of the first disk relative to the second disk drawing the second mounting surface against the first mounting surface.

30. The method of claim 24, further comprising:
  (c) calibrating a helmet-mounted display system (HMD) that controls the display of symbology on the display device by aligning helmet referenced symbology generated by the HMD and displayed on the display device with vehicle referenced symbology displayed by a heads-up display (HUD) system.

31. The method of claim 30, wherein the calibrating step further comprises
  i. changing the symbology generated by the HMD and displayed on the display device from helmet-referenced to vehicle-referenced; and
  ii. aligning the vehicle-referenced symbology generated by the HMD and displayed on the display device with vehicle-referenced symbology displayed by the HUD system.

32. The method of claim 31, wherein the calibrating step further comprises:
  iii. aligning of helmet-referenced text symbology generated by the HMD and displayed on the display device with the vehicle-referenced symbology generated by the HMD and displayed on the display device.

33. A method of mounting a display pod to a helmet, the display pod including a transparent display device and being part of a helmet-mounted display system, the method comprising:
  (a) positioning the display pod so that the display device is located in a line of sight of an eye of a person wearing the helmet by moving a second surface located on the display pod relative to the first mounting surface located on the helmet;
  (b) retaining the location of the display device in the line of sight by positioning the second mounting surface against the first mounting surface and affixing the position of the second mounting surface relative to the first mounting surface; and
  (c) calibrating a helmet-mounted display system (HMD) that controls the display of symbology on the display device by aligning helmet referenced symbology generated by the HMD and displayed on the display device with vehicle referenced symbology displayed by a heads-up display (HUD) system.

* * * * *